Oct. 16, 1973  JUNTARO YURIMOTO ET AL  3,766,106
RESIN COMPOSITIONS CONTAINING MAINLY POLYVINYL CHLORIDE
SUITABLE FOR PRODUCING BATTERY SEPARATOR
Filed June 1, 1971
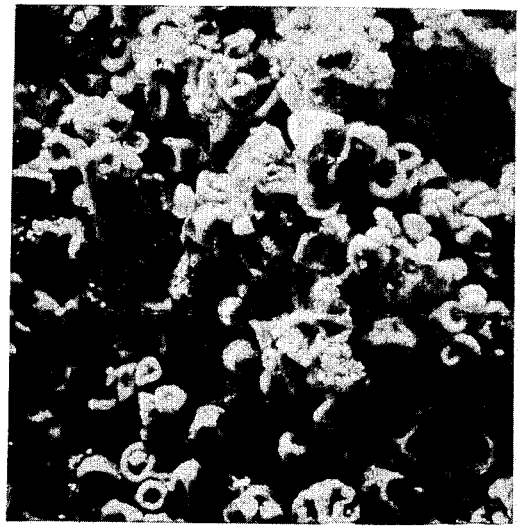
JUNTARO YURIMOTO
IKOH ITO
TAKASHI KIKU
TOSHIKI DOI
TAKESHI SEKIHARA
INVENTORS
BY
*Stevens, Davis, Miller & Mosher*
ATTORNEYS United States Patent Office
3,766,106
Patented Oct. 16, 1973

3,766,106
RESIN COMPOSITIONS CONTAINING MAINLY POLYVINYL CHLORIDE SUITABLE FOR PRODUCING BATTERY SEPARATOR
Juntaro Yurimoto and Ikoh Ito, Niihama, Takashi Kiku, Hirakata, and Toshiki Doi and Takeshi Sekihara, Niihama, Japan, assignors to Sumitomo Chemical Company, Limited, Osaka, Japan
Filed June 1, 1971, Ser. No. 148,658
Claims priority, application Japan, June 4, 1970, 45/48,960
Int. Cl. C08f 29/24, 45/04, 45/58
U.S. Cl. 260—17 A                7 Claims

ABSTRACT OF THE DISCLOSURE

A resin composition comprising (i) 100 parts by weights of a mixture consisting of 50 to 95% by weight of a suspension-polymerized polyvinyl chloride having an average particle size of 10 to $40\mu$, and an average polymerization degree of 700 to 1,400 which has been prepared by suspension-polymerizing vinyl chloride in the presence of cellulose derivatives containing alkyl group and/or hydroxy-alkyl group in their units as a suspension stabilizer and an anionic emulsifying agent as an auxiliary suspension stabilizer and 50 to 5%, by weight of an emulsion-polymerized polyvinyl chloride having an average polymerization degree of 700 to 1,400 in which particles having an average primary particle size of 0.1 to $1.5\mu$ have been agglomerated to particles having an average secondary particle size of 20 to $50\mu$, and (ii) 0.1 to 3 parts by weight of a nonionic antistatic agent is high in processability and is suitable for producing a battery separator excellent in mechanical strength and electric resistance.

---

This invention relates to a resin composition containing mainly a polyvinyl chloride and being suitable for the production of a battery separator.

More particularly, the invention pertains to a polyvinyl chloride resin composition high in processability and suitable for the production of a battery separator excellent in mechanical strength and electric resistance which comprises a mixture consisting of 50 to 95% by weight of a suspension-polymerized polyvinyl chloride prepared by polymerizing vinyl chloride in the presence of cellulose derivatives containing alkyl group and/or hydroxyalkyl group in their units as a suspension stabilizer and an anionic emulsifier as an auxiliary suspension stabilizer, and 50 to 5% by weight of an emulsion polymerized polyvinyl chloride, and a nonionic antistatic agent.

It is well known that a polyvinyl chloride may be used in a resin composition for battery separator. It is also well known that a polyvinyl chloride used for the production of battery separator is required (1) to be excellent in processability during the production of separator and (2) to give a separator prominent in mechanical strength, high in porosity and low in electric resistance.

With an aim to provide at low cost a polyvinyl chloride resin composition excellent in processability and suitable for the production of a battery separator excellent in mechanical strength and electric resistance, the present inventors made extensive studies to find that such a resin composition as mentioned above can be obtained by mixing (i) 100 parts by weight of a mixture composed of 50 to 95% by weight of a suspension-polymerized polyvinyl chloride having an average particle size of 10 to $40\mu$, and an average polymerization degree of 700 to 1,400 which has been prepared by polymerizing vinyl chloride in the presence of at least one cellulose derivative containing alkyl group and/or hydroxyalkyl group in their units as a suspension stabilizer and at least one anionic emulsifier as an auxiliary suspension stabilizer, and 50 to 5% by weight of an emulsion-polymerized polyvinyl chloride having an average polymerization degree of 700 to 1,400 in which particles having an average primary particle size of 0.1 to $1.5\mu$ have been agglomerated to particles having an average secondary particle size of 20 to $50\mu$, with (ii) 0.1 to 3 parts by weight of a nonionic antistatic agent.

The suspension-polymerized polyvinyl chloride used in the present invention should be a resin prepared by suspension-polymerizing vinyl chloride in the presence of such a specific suspension stabilizer system as a combination of at least one cellulose derivative containing alkyl group and/or hydroxyalkyl group in their units as the main suspension stabilizer which is selected from the group consisting of alkyl celluloses such as methyl cellulose, ethyl cellulose and propyl cellulose, and hydroxyalkyl celluloses such as hydroxypropoxymethyl cellulose, hydroxyethyl cellulose, hydroxypropyl cellulose and hydroxybutyl cellulose, with at least one anionic emulsifier as an auxiliary suspension stabilizer which is selected from the group consisting of alkali metal salts of alkylsulfate, dialkylsulfosuccinate and alkylbenzensulfonic acids. Preferable as the said auxiliary suspension stabilizer are sodium dodecylsulfate, sodium dioctylsulfosuccinate and sodium dodecylbenzenesulfonate. The suspension stabilizer and auxiliary suspension stabilizer are used in amounts of 0.05 to 0.5% by weight and 0.005 to 0.1% by weight, respectively, based on the weight of vinyl chloride monomer.

As a suspension polymerization catalyst, there may be used any of such known oil-soluble catalysts as lauroyl peroxide, benzoyl peroxide, azobisisobutyronitrile and diisopropyl peroxydicarbonate. Further, there may be used in the polymerization any of such known buffer agents as alkali metal salts of carbonic, phosphoric and sulfurous acids, for example, sodium carbonate, sodium bicarbonate, potassium carbonate, sodium phosphate, sodium dihydrogen phosphate, sodium monohydrogen phosphate, sodium sulfite, sodium bisulfite and the like. These agents have the effects that they facilitate the control of particle size. Ordinarily, the suspension polymerization is effected at a temperature of 30° to 70° C.

The reason why a resin composition containing as one component a polyvinyl chloride prepared according to the above-mentioned specific suspension polymerization process gives a satisfactory battery separator has not been elucidated yet. However, the polymer obtained according to the aforesaid process is composed of particles of less than $90\mu$ which have an average particle size of 10 to $40\mu$ and a pore volume (volume of pores of less than 73,000 A. in size as measured according to mercury injection method) of 0.2 cm.$^3$/g. or more, and which are considerably uneven at the surface as is clear from the accompanying drawing. The present inventors, therefore, consider that because of these properties, the polymer can be a resin high in processability and suitable for the production of a battery separator excellent in mechanical strength and electric resistance. Further, not only a suspension polymerization product obtained according to the aforesaid process is less expensive than an emulsion polymerization product, but also all the particles obtained can be used without any sieving or the like operation, so that there is additionally attained such an advantage that a battery separator can be produced at an extremely low cost.

Heretofore, many processes have been known for the suspension polymerization of vinyl chloride monomers. However, polyvinyl chloride obtained according to other processes than the process mentioned above have such a large average particle size as $70\mu$ or more, so that the polymers, when used as they are, are low in processability and cannot give but unsatisfactory separators having coarse, through pores.

The present composition further contains as the other resin component 50 to 5% by weight based on the total weight of the resin components of an emulsion-polymerized polyvinyl chloride having an average polymerization degree of 700 to 1,400 in which particles having an average primary particle size of 0.1 to 1.5µ have been agglomerated to particles having an average secondary particle size of 20 to 50µ. By incorporation of such emulsion-polymerized polyvinyl chloride, not only the composition can be greatly improved, as compared with the case where the aforesaid suspension-polymerized polyvinyl chloride is used alone, in powder spread coating property and roll adhesion at the time of powder spread coating, but also a separator obtained by sintering the composition can be improved in surface state and reinforced rib-forming property. In addition, there is attained such a processability-improving effect that the application of processing temperature and processing speed in wide ranges can be made possible.

In case the amount of the emulsion-polymerized polyvinyl chloride is more than 50% by weight, the composition can give nothing but a separator low in mechanical strength, while in case the amount of said resin is less than 5% by weight, the composition is less improved in processability.

The emulsion-polymerized polyvinyl chloride is obtained by emulsion-polymerizing vinyl chloride in the presence of a known anionic emulsifier such as alkali metal salts of alkylsulfate, dialkyl sulfosuccinate or alkylbenzene sulfonic acids, and a known water-soluble radical initiator such as hydrogen peroxide, potassium persulfate or ammonium persulfate, either singly or in combination with an organic or inorganic reducing agent such as ε-ascorbic acid, Rongalit, ferrous sulfate or cuprous sulfate. Preferable as the said anionic emulsifier are sodium dodecylsulfate, sodium dodecylbenzenesulfonate, sodium di-2-ethylhexyl sulfosuccinate and sodium dibutyl sulfosuccinate.

The suspension-polymerized and emulsion-polymerized polyvinyl chloride used in the present invention are those which have an average polymerization degree of 700 to 1,400. For the preparation of polyvinyl chloride having an average polymerization degree of 700 to 1,400, there may be adopted such a procedure that the polymerization temperature is controlled, that is, in case a chain transfer agent is not used, the polymerization may be carried out at a temperautre of about 50° to 70° C., or a halogenated hydrocarbon such as trichloroethylene, tetrachloroethylene or tetrafluoromethane, or a mercaptan such as dodecylmercaptan, is added to the polymerization system. In case the average polymerization degree is less than 700, the separator obtained from the composition is lowered in mechanical strength and porosity, while in case the polymerization degree is more than 1,400, a high temperature is required for the sintering of the composition.

The nonionic antistatic agent, which is one component of the present composition, is used in order to improve the processability of the composition. Examples of the nonionic antistatic agent are block copolymers of ethylene oxide and propylene oxide, alkyl ethers of polyoxyethylene, alkyl esters of polyoxyethylene, aryl ethers of polyoxyethylene, aryl esters of polyoxyethylene, monoalkyl esters of sorbitan, polyalkyl esters of sorbitan, and condensation products of mono- and poly-alkyl esters of sorbitan with ethylene oxide, said alkyl or aryl group having 6 to 18 carbon atoms. The amount of the nonionic antistatic agent is 0.1 to 3 parts by weight per 100 parts by weight of the resin. In case the amount of said antistatic agent is less than 0.1 part by weight, the composition is not improved in processability. On the other hand, even if the amount thereof exceeds 3 parts by weight, no effect proportional thereto can be expected. Generally, therefore, the antistatic agent is used in an amount of less than 3 parts by weight per 100 parts by weight of the resin.

The antistatic agent may be used in admixture with the suspension-polymerized and emulsion-polymerized polyvinyl chloride, or may be added at the emulsion polymerization or spray drying step for preparation of the emulsion-polymerized polyvinyl chloride.

The mixing of the suspension-polymerized polyvinyl chloride with the emulsion-polymerized polyvinyl chloride and the nonionic antistatic agent may be carried out by use of a Henschell mixer, a ribbon blender or the like. In this case, a stabilizer, and a filler such as silica or alumina may also be incorporated.

For the production of a separator by use of the polyvinyl chloride resin composition of the present invention, there may be adopted any of the known processes carried out by, for example, passing the resin composition on a comb-shaped die to mold the composition into a suitable shape as a battery separator, and then sintering the molded composition in a hot air furnace.

The process of the present invention is illustrated in further detail below with reference to examples, but the scope of the invention is, of course, not limited to these examples.

EXAMPLE 1

A mixture comprising 100 parts by weight of vinyl chloride monomer, 150 parts by weight of demineralized water, 0.1 part by weight of lauroyl peroxide, and each one of the suspension stabilizers and auxiliary suspension stabilizers shown in Table 1 was fed to a 5-liter, stainless steel autoclave, and then polymerized at 60° C. for 10 hours. The average particle size and pore volume of the resulting polymer were as set forth in Table 1.

TABLE 1

| Run number | Suspension stabilizer | Amount added (part by weight) | Auxiliary suspension stabilizer | Amount added (part by weight) | Average particle size (µ) | Pore volume (cm.³/g.) | Average polymerization degree |
|---|---|---|---|---|---|---|---|
| 1 | Methyl cellulose ("Methocell 90 HG 100," produced by the Dow Chemical Co.). | 0.3 | | | 70 | 0.18 | 920 |
| 2 | do | 0.3 | Sodium dioctyl sulfosuccinate | 0.03 | 30 | 0.35 | 890 |
| 3 | do | 0.3 | do | 0.15 | 35 | 0.46 | 870 |
| 4 | do | 0.3 | Sodium dioctyl sulfosuccinate plus Disodium hydrogen phosphate | 0.03 0.1 | 25 | 0.32 | 900 |
| 5 | do | 0.3 | Sodium lauryl sulfate | 0.03 | 25 | 0.44 | 890 |
| 6 | do | 0.3 | Sodium dodecyl benzenesulfonate | 0.03 | 25 | 0.44 | 920 |
| 7 | Hydroxyethyl cellulose ("Natrosol 250 GR," produced by Hercules Co.). | 0.3 | Sodium lauryl sulfate | 0.03 | 40 | 0.31 | 910 |
| 8 | Polyvinyl alcohol ("Gosenol KH-20," produced by Nippon Gosei Co.). | 0.3 | | | 130 | 0.10 | 910 |
| 9 | do | 0.3 | Sodium dioctyl sulfosuccinate | 0.03 | 120 | 0.20 | 900 |
| 10 | Methyl cellulose ("Methocell 90 HG 100," produced by the Dow Chemical Co.). | 0.3 | do | 0.03 | 30 | 0.25 | [1] 500 |
| 11 | do | 0.3 | do | 0.03 | 30 | 0.40 | [2] 2,000 |

[1] Obtained by the same polymerization method as in Example 1, except that the polymerization temperature was 75° C.
[2] Obtained by the same polymerization method as in Example 1, except that the polymerization temperature was 42° C.

As is clear from Table 1, the polymers obtained by use of the suspension stabilizer systems (Run Nos. 2 to 7) according to the present invention are smaller in average particle size and larger in pore volume than the polymers obtained by use of the substituted cellulose alone (Run No. 1) and other suspension stabilizer systems (Run Nos. 8 and 9) than those of the present invention.

EXAMPLE 2

Using a 200-liter super mixer, the suspension-polymerized polyvinyl chloride obtained in Example 1 and/or an emulsion polymerized polyvinyl chloride were mixed for 10 minutes with an antistatic agent in an amount as shown in Table 2. The resulting composition was continuously sintered at 240° C. to obtain a battery separator. The mixing conditions and the physical properties of the battery separator obtained were as set forth in Table 2.

From Table 2, it is clear that the control resin compositions (Run Nos. 18, 20, 25 and 26) containing no antistatic agent or a nonionic antistatic agent in an amount outside the scope of the present invention are inferior in such properties as spread coating property and roll adhesion to the present resin compositions (Run Nos. 12, 13, 14, 15, 16 and 17); that the control resin composition (Run No. 21), in which the amount of the emulsion-polymerized polyvinyl chloride is more than 50 parts by weight based on the total weight of the resins, is markedly low in tensile strength; that the control resin compositions (Run Nos. 22 and 23), in which are used suspension-polymerized polyvinyl chlorides prepared according to other processes than that of the present invention, are poor in both spread coating property and electric resistance; and that the control resin composition (Run No. 24), in which the particle size of the emulsion-polymerized polyvinyl chloride is out of the range regulated by the present invention, is inferior in both processability and tensile strength. When the polymerization degree is out of the range regulated by the present invention (Run Nos. 27 and 28), the tensile strength is low and the processability is inferior. When no emulsion-polymer is contained (Run No. 19), the processability is low.

What is claimed is:

1. A dry polyvinyl chloride resin composition high in processability and suitable for the production of a battery separator having excellent mechanical strength and electrical resistance consisting essentially of
   (i) 100 parts by weight of a mixture consisting of
      (a) 50% to 95% by weight of a suspension-polymerized polyvinyl chloride having an average particle size of 10 to 40 microns, and an average polymerization degree of 700 to 1,400 which has been prepared by suspension-polymerizing vinyl chloride in the presence of a suspension stabilizer

TABLE 2

| Run No. | Resin | Amount added (part by weight) | Average particle size (μ) | Antistatic agent | Amount added (part by weight) | Spread coating property | Roll adhesion | Porosity (percent) | Tensile strength (kg/mm.²) | Electric resistance (Ω·dm.²/mm.) |
|---|---|---|---|---|---|---|---|---|---|---|
| 12 | Suspension polymerized PVC of Run No. 2 / Emulsion polymerized PVC[1] | 80 / 20 | 30 / 35 | Polyoxyethylene nonylphenyl ether ("AS-103," produced by Kao Soap Co.) | 0.3 | Favorable | None | 55 | 0.65 | 0.0025 |
| 13 | Suspension polymerized PVC of Run No. 2 / Emulsion polymerized PVC[1] | 60 / 40 | 30 / 35 | do | 0.3 | do | do | 56 | 0.40 | 0.0020 |
| 14 | Suspension polymerized PVC of Run No. 2 / Emulsion polymerized PVC[1] / Silica | 75 / 20 / 5 | 30 / 35 | do | 0.3 | do | do | 60 | 0.75 | 0.0025 |
| 15 | Suspension polymerized PVC of Run No. 4 / Emulsion polymerized PVC[1] | 80 / 20 | 25 / 35 | Sorbitan monolaurate (Emasol-110, produced by Kao Soap Co.) | 0.3 | do | do | 55 | 0.63 | 0.0023 |
| 16 | Suspension polymerized PVC of Run No. 2 / Emulsion polymerized PVC[1] | 80 / 20 | 30 / 35 | Ethyleneoxide-propyreneoxide block copolymer (Epan-410, Daiichi Kogyo Seiyaku Co.) | 0.3 | do | do | 54 | 0.70 | 0.0023 |
| 17 | Suspension polymerized PVC of Run No. 2 / Emulsion polymerized PVC[1] | 80 / 20 | 30 / 35 | do | 0.3 | do | do | 55 | 0.60 | 0.0025 |
| 18 | Suspension polymerized PVC of Run No. 2 / Emulsion polymerized PVC[1] | 80 / 20 | 30 / 35 | Polyoxyethylene nonylphenyl ether (AS-103, produced by Kao Soap Co.) | 100 | Poor / Somewhat poor | Observed / None | 49 / 50 | 0.80 / 0.75 | 0.003 / 0.003 |
| 19 | do | | | | 0.3 | do | Observed | 54 | 0.60 | 0.0025 |
| 20 | Suspension polymerized PVC of Run No. 2 / Emulsion polymerized PVC[1] | 80 / 20 | 30 / 35 | Polyoxyethylene nonylphenyl ether (AS-103, produced by Kao Soap Co.) | | Favorable | None | 56 | 0.15 | 0.0018 |
| 21 | Suspension polymerized PVC of Run No. 2 / Emulsion polymerized PVC[1] | 40 / 60 | 30 / 35 | Polyoxyethylene nonylphenyl ether (AS-103, produced by Kao Soap Co.) | 0.3 | Poor | do | 45 | 0.55 | 0.005 |
| 22 | Suspension polymerized PVC of Run No. 1 / Emulsion polymerized PVC[1] | 80 / 20 | 70 / 35 | do | 0.3 | do | do | 48 | 0.55 | 0.006 |
| 23 | Suspension polymerized PVC of Run No. 9 / Emulsion polymerized PVC[1] | 80 / 20 | 120 / 35 | do | 0.3 | do | do | 53 | 0.10 | 0.0023 |
| 24 | Suspension polymerized PVC of Run No. 2 / Emulsion polymerized PVC[2] | 100 / 20 | 25 / 20 | do | 0.3 | do | Observed | 50 | 0.72 | 0.0028 |
| 25 | Suspension polymerized PVC of Run No. 4 / Emulsion polymerized PVC of Run No. 2 | 80 / 20 | 30 / 35 | Polyoxyethylene nonylphenyl ether (AS-103, produced by Kao Soap Co.) | 0.01 | do | do | 55 | 0.65 | 0.003 |
| 26 | Suspension polymerized PVC of Run No. 2 / Emulsion polymerized PVC of Run No. 10 | 80 / 20 | 30 / 35 | do | 0.3 | Favorable | do | 40 | 0.20 | 0.010 |
| 27 | Suspension polymerized PVC of Run No. 2 / Emulsion polymerized PVC[1] | 80 / 20 | 30 / 35 | Polyoxyethylene nonylphenyl ether (AS-103, produced by Kao Soap Co.) | 0.3 | Somewhat poor | None | 56 | 0.10 | 0.003 |
| 28 | Suspension polymerized PVC of Run No. 2 / Emulsion polymerized PVC of Run No. 11 | 80 / 20 | 30 / 35 | do | 0.3 | | | | | |

[1] The emulsion-polymerized polyvinyl chloride used in Example 2 was a resin having an average secondary particle size of 35μ, which had been prepared by feeding a mixture comprising 100 parts by weight of vinyl chloride monomer, 0.2 part by weight of 0.2μ of polyvinyl chloride latex as a seed, 150 parts by weight of ion-exchanged water 0.1 part by weight of potassium persulfate and 0.3 part by weight of sodium alkylbenzene sulfonate into a 5-liter autoclave, polymerizing the mixture at 50° C. for 10 hours, and then spray-drying the resulting emulsion having an average primary particle size of 0.3μ.

[2] The polymerization was effected in the same manner as mentioned just above but the spray-drying conditions were changed so that the secondary particle size was 70μ.

selected from the group consisting of alkyl cellulose, wherein the alkyl group has from 1 to 4 carbon atoms and hydroxyalkyl cellulose, wherein the hydroxyalkyl group has from 1 to 4 carbon atoms and an anionic emulsifier acting as an auxiliary suspension stabilizer selected from the group consisting of alkali metal salts of alkyl sulfates, dialkylsulfosuccinates and alkylbenzenesulfonic acids, and (b) 50% to 5% by weight of an emulsion-polymerized polyvinyl chloride having an average polymerization degree of 700 to 1,400 in which particles having an average primary particle size of 0.1 to 1.5 microns have been agglomerated to particles having an average secondary particle size of 20 to 50 microns, and (ii) 0.1 to 3 parts by weight of a nonionic antistatic agent selected from the group consisting of block copolymers of ethylene oxide and propylene oxide, alkyl ethers of polyoxyethylene, alkyl esters of polyoxyethylene, aryl ethers of polyoxyethlene, aryl esters of polyoxyethylene, monoalkyl esters of sorbitan, polyalkyl esters of sorbitan, and condensation products of mono- and poly-alkyl esters of sorbitan with ethylene oxide.

2. A composition according to claim 1, wherein the amount of the suspension stabilizer and the auxiliary suspension stabilizer is 0.05 to 0.5% by weight and 0.005 to 1% by weight, respectively, based on the weight of the vinyl chloride monomer.

3. A composition according to claim 1, wherein the suspension polymerization is effected in the presence of an oil-soluble catalyst.

4. A composition according to claim 1, wherein the suspension polymerization is effected at a temperature of 30° to 70° C.

5. A composition according to claim 1, wherein the nonionic antistatic agent is polyoxyethylene nonylphenyl ether, sorbitan monolaurate and ethylene-oxide-propylene-oxide block copolymer.

6. A composition according to claim 1, wherein the composition additionally contains a stabilizer and a filler.

7. A composition according to claim 6, wherein the filler is silica.

References Cited
UNITED STATES PATENTS

| | | | |
|---|---|---|---|
| 2,993,022 | 7/1961 | Coler | 260—17 R |
| 3,022,367 | 2/1962 | Horowitz et al. | 136—146 X |
| 3,090,763 | 5/1963 | Hillier | 260—899 X |
| 3,318,825 | 5/1967 | Enk et al. | 260—17 R X |
| 3,510,543 | 5/1970 | Kühne et al. | 260—899 X |
| 3,553,184 | 1/1971 | Lederer et al. | 260—17 X |
| 3,563,936 | 2/1971 | Merrill et al. | 260—899 X |
| 3,438,912 | 4/1969 | Tsukamoto et al. | 136—146 X |

WILLIAM H. SHORT, Primary Examiner

L. M. PHYNES, Assistant Examiner

U.S. Cl. X.R.

136—146; 260—29.6 ME, 29.6 MQ, 29.6 RB, 41 A, 899, DIGEST 17